Oct. 29, 1963   R. P. ALEXANDER ETAL   3,109,028
ORGANOBORON CYCLIC KETONES AND THEIR PREPARATION
Filed Nov. 6, 1959
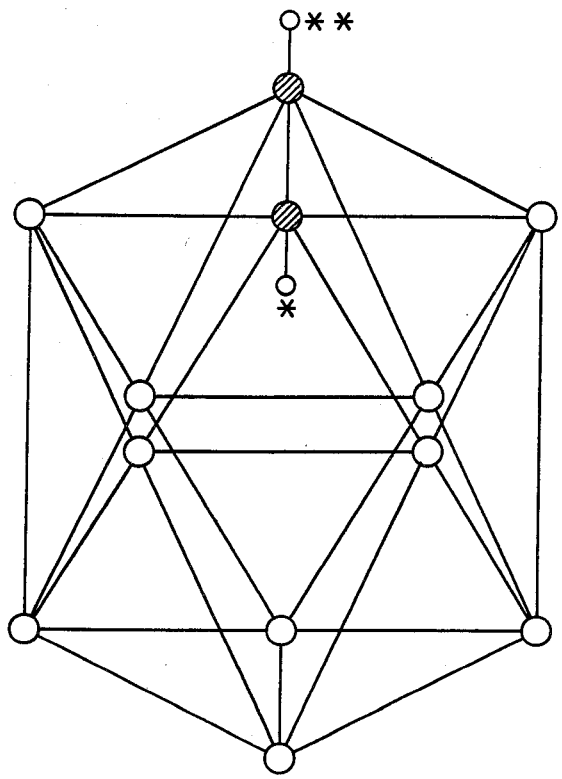
○ BORON
◉ CARBON
o HYDROGEN ON CARBON
(HYDROGEN ATOMS ON
BORON OMITTED FOR
CLARITY)
INVENTORS
ROY P. ALEXANDER
BY JOYCE A. REID
ATTORNEYS

United States Patent Office 3,109,028
Patented Oct. 29, 1963

3,109,028
ORGANOBORON CYCLIC KETONES AND THEIR PREPARATION
Roy P. Alexander, Lewiston, and Joyce A. Reid, Tonawanda, N.Y., assignors to Olin Mathieson Chemical Corporation, a corporation of Virginia
Filed Nov. 6, 1959, Ser. No. 851,474
7 Claims. (Cl. 260—586)

This invention relates to organoboron cyclic ketones and to a method for their preparation. The organoboron cyclic ketones are prepared by decarboxylating an organoboron dicarboxylic acid of the class $$RR'B_{10}H_8(CR''CR''')$$

wherein R and R' are each hydrogen or an alkyl group containing from 1 to 5 carbon atoms and wherein R'' and R''' are each a carboxyl group, a carboxymethyl group or a carboxyethyl group, the total number of carbon atoms in R'' and R''' taken together, being at least 4 and no more than 5.

Organoboron carboxylic acids of the class $$RR'B_{10}H_8(CR''CR''')$$

wherein R and R' are hydrogen or an alkyl group containing from 1 to 5 carbon atoms, and wherein R'' and R''' are both carboxymethyl groups, or one is a carboxymethyl group and the other a carboxyethyl group, can be prepared according to the method described in application Serial No. 812,066 filed May 8, 1959 to John W. Ager, Jr. et al.

Organoboron carboxylic acids of the class $$RR'B_{10}H_8(CR''CR''')$$

wherein R and R' are hydrogen or an alkyl group containing from 1 to 5 carbon atoms, and wherein one of R'' and R''' is a carboxyl group and one of R'' and R''' is a carboxyethyl group, can be prepared according to the method described in application Serial No. 851,472, filed of even date herewith, to John W. Ager, Jr. et al.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention, when incorporated with oxidizers, are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

In accordance with this invention it was discovered that organoboron dicarboxylic acids of the class $$RR'B_{10}H_8(CR''CR''')$$

wherein R and R' are each hydrogen or an alkyl group containing from 1 to 5 carbon atoms and wherein R'' and R''' are each a carboxyl group, a carboxymethyl group or a carboxyethyl group, the total number of carbon atoms in R'' and R''', taken together, being at least 4 and no more than 5, can be decarboxylated by heating with the evolution of carbon dioxide to form cyclic ketones of the class

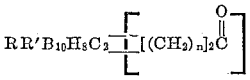

wherein R and R' are each hydrogen or an alkyl radical containing from 1 to 5 carbon atoms, and $n$ is from 0 to 2, the total number of carbon atoms in $[(CH_2)_n]_2$ being at least 2 and not more than 3.

The decarboxylation reaction is advantageously carried out by heating the organoboron dicarboxylic acid in vacuo above its melting point and subliming the cyclic ketone from the reaction mixture. When relatively large quantities are involved, considerable amounts of the organoboron dicarboxylic acid may appear in the sublimate. It has been found, however, that a relatively small amount of an oxide, hydroxide or carbonate of an alkaline earth metal in admixture with the organoboron dicarboxylic acid facilitates the decarboxylation, barium carbonate being particularly effective. The molar ratio of organoboron dicarboxylic acid to alkaline earth metal oxide, hydroxide or carbonate can vary from about 0.5 to 175:1.

The process of this invention is illustrated in detail in the following examples.

Example I $B_{10}H_{10}[C(CH_2COOH)]_2$ (5 g.) and magnesium oxide (1 g.) were mixed and charged to a small flask equipped with a modified vacuum sublimation apparatus. The flask was heated in an oil bath to 180° C. and held there ±10° C. for 1 hour at atmospheric pressure. The system was evacuated two times during this period to remove water and then was filled with nitrogen. The temperature was raised to 250° C. and held there ±20° C. until there was a partial melt in the flask. The system was evacuated to about 1 mm. Hg absolute and the temperature was held at 250° C. for 2 hours. The white solid which sublimed (2.1 g.) was identified as the cyclic ketone

by infrared analysis. $B_{10}H_{10}[C(CH_2COOH)]_2$ (1.0 g.) was recovered from the sublimation residue.

Example II $B_{10}H_{10}[C(CH_2COOH)]_2$ (10 g.) and barium hydroxide (0.5 g.) were mixed and charged to a flask equipped with a modified sublimation apparatus. The apparatus was evacuated and filled with nitrogen. The mixture was heated to 240° C. (evacuated once to remove water) and held there 1 hour at atmospheric pressure. The system was then evacuated and held at 240° C. for about 1 hour. The yield of the sublimed cyclic ketone

was 5.8 g. (76.3 percent of theoretical).

Example III $B_{10}H_{10}[C(CH_2COOH)]_2$ (10 g.) and 0.5 g. of barium carbonate were mixed and charged to a flask which was connected to a modified sublimation apparatus. The contents of the flask were heated to 230° C. and held there ±10° C. for about 2½ hours. The system was evacuated for 1 hour while temperature was maintained. The yield of sublimed cyclic ketone

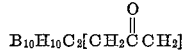

was 6.2 g. (82 percent of theoretical).

Example IV $B_{10}H_{10}[C(CH_2COOH)]_2$ (40 g.) and barium carbonate (2 g.) were mixed and put in a flask equipped with a modified sublimation apparatus. The oil bath was heated to 240±5° C. The system was evacuated several times during heating to remove water. A semi melt was obtained and the system was evacuated and maintained at 240±5° C. for about 1 hour. The total yield of cyclic ketone

was 24.7 g. which is 81 percent of theoretical. The melting point of the product was 146 to 150° C. with sublimation occurring at about 100° C.

*Example V*

$B_{10}H_{10}[C(CH_2COOH)]_2$ (60 g.) and barium carbonate (4 g.) were ground together and charged to a flask connected to a modified sublimation apparatus. The mixture was held at 240 to 250° C. for 4 hours. The system was evacuated for brief periods during this time and for about 30 minutes at the end. The sublimed product, which was shown by mass spectrometric analysis to be the cyclic ketone

with no outstanding contaminants, weighed 36 grams.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers, such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and boron compound. The ingredients can be thoroughly mixed with simultaneous removal of solvent, and following this, the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

The compound of the formula

prepared as described in Examples I through V can also be designated

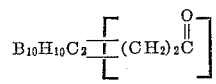

has the same structural formula as that shown in the accompanying drawing with the exception that the hydrogen atoms indicated by the single and double asterisk are replaced by the radical

We claim:

1. A method for the production of an organoboron cyclic ketone which comprises heating at an elevated temperature with the evolution of carbon dioxide an organoboron dicarboxylic acid of the class $$RR'B_{10}H_8(CR''CR''')$$

wherein R and R' are each selected from the class consisting of hydrogen and an alkyl radical containing 1 to 5 carbon atoms and wherein R'' and R''' are each selected from the class consisting of a carboxyl group, a carboxymethyl group and a carboxyethyl group, the total number of carbon atoms in R'' and R''', taken together, being at least 4 and no more than 5.

2. The method of claim 1 wherein the organoboron compound is $B_{10}H_{10}[C(CH_2COOH)]_2$.

3. The method of claim 1 wherein the heating is carried out while the organoboron dicarboxylic acid is in admixture with a material selected from the class consisting of alkaline earth metal oxides, hydroxides and carbonates.

4. The method of claim 3 wherein the said material is barium carbonate.

5. The method of claim 3 wherein the organoboron dicarboxylic acid is $B_{10}H_{10}[C(CH_2COOH)]_2$ and the said material is barium carbonate.

6. Organoboron cyclic ketones of the class

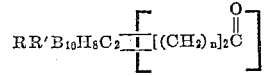

wherein R and R' are selected from the class consisting of hydrogen and an alkyl radical containing from 1 to 5 carbon atoms, and $n$ is from 0 to 2, the total number of carbon atoms in $[(CH_2)_n]_2$ being at least 2 and not more than 3.

7.

No references cited.